United States Patent [19]

Watson

[11] 4,345,971
[45] Aug. 24, 1982

[54] DISTILLATION EMPLOYING HEAT PUMP

[76] Inventor: W. Keith R. Watson, El Camino Real (Box 1547), Rancho Santa Fe, Calif. 92067

[21] Appl. No.: 130,143

[22] Filed: Mar. 13, 1980

[51] Int. Cl.³ .............................................. C02F 1/04
[52] U.S. Cl. .................................. 202/177; 202/235; 203/10; 203/22; 203/100; 203/DIG. 4
[58] Field of Search ..................... 203/10, 11, DIG. 4, 203/DIG. 17, 100, 22–27; 202/177, 176, 232, 235; 159/22–28; 196/104, 134

[56] References Cited

U.S. PATENT DOCUMENTS

| | | | |
|---|---|---|---|
| 1,466,670 | 9/1923 | Monti | 203/DIG. 4 |
| 3,312,600 | 4/1967 | Morton | 203/DIG. 4 |
| 4,181,577 | 1/1980 | Foley | 203/DIG. 4 |
| 4,209,364 | 6/1980 | Rothschild | 203/DIG. 4 |

FOREIGN PATENT DOCUMENTS 964504  5/1957  Fed. Rep. of Germany ........ 203/49

*Primary Examiner*—Wilbur L. Bascomb, Jr.
*Attorney, Agent, or Firm*—William W. Haefliger

[57] ABSTRACT

Heat transfer apparatus comprises:
(a) a heat pump, and
(b) a distillation means operatively connected with the heat pump to receive distillable fluid therefrom for condensation and release of latent heat $Q_c$,
(c) the heat pump connected with said distillation means to receive said latent heat for addition of work input and re-transfer to the distillation fluid.

13 Claims, 3 Drawing Figures

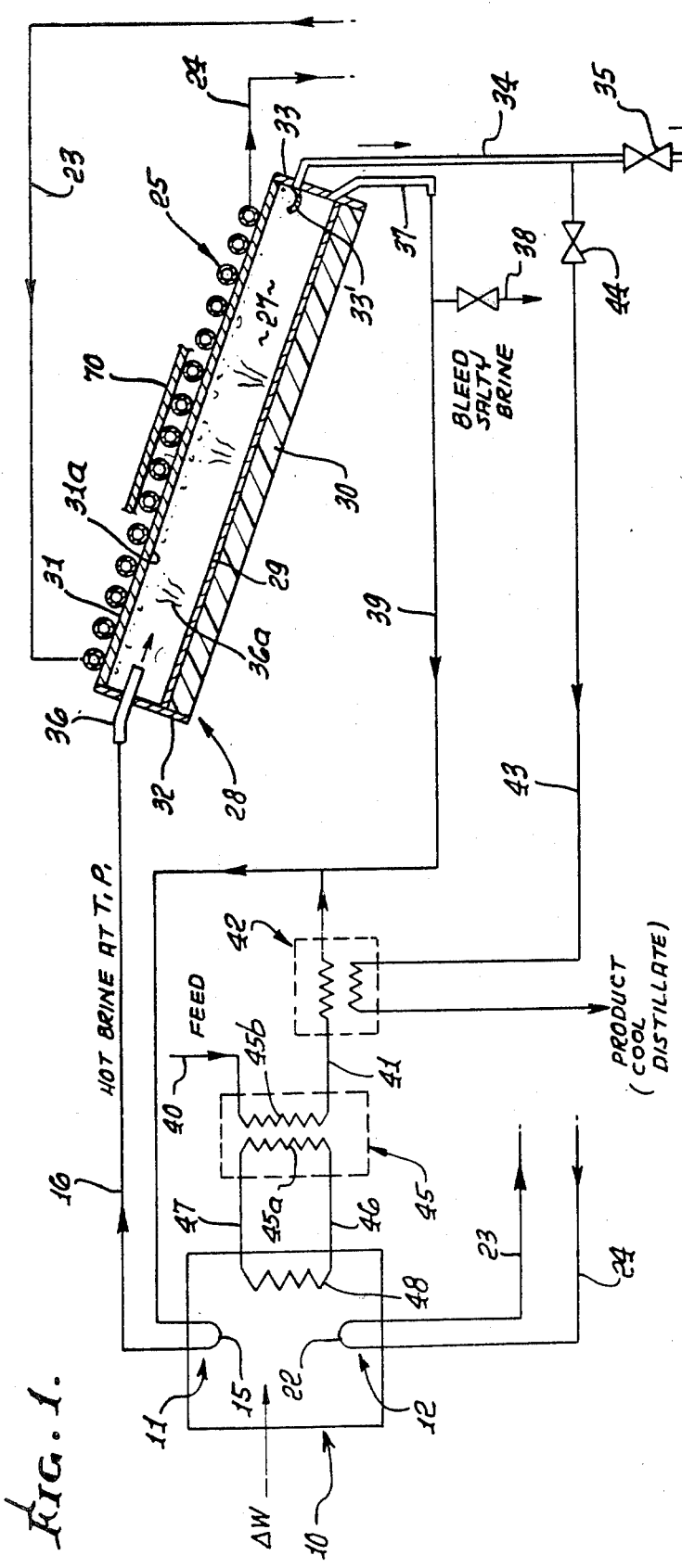
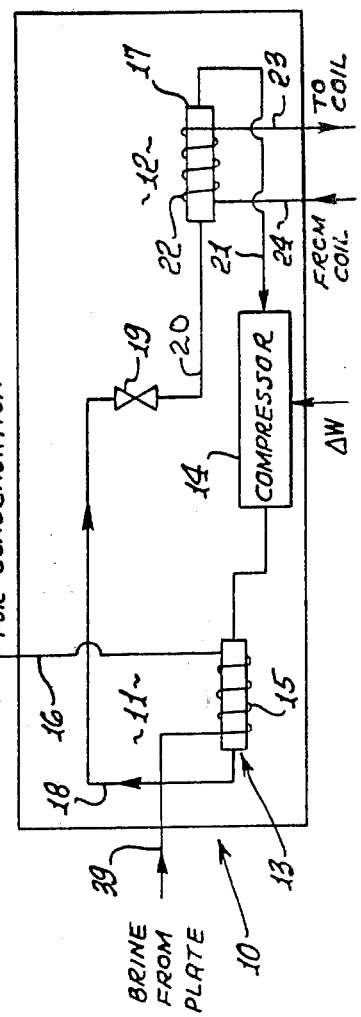
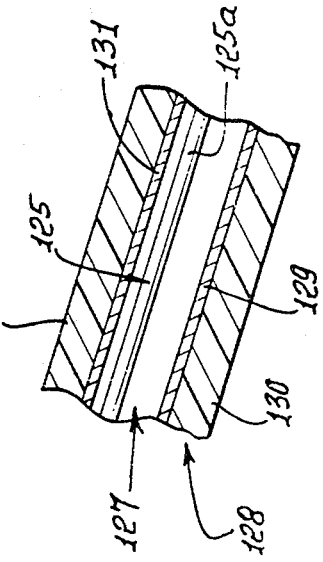

DISTILLATION EMPLOYING HEAT PUMP

BACKGROUND OF THE INVENTION

This invention relates generally to distillation, and more particularly concerns highly efficient distillation methods and systems employing heat pumps.

The operation of a heat pump involves, for example, the use of work $\Delta\omega$ to raise the heat of a fluid from a relatively lower temperature $T_c$ to a relatively higher temperature $T_H$. See for example the following equation:

$$\Delta\omega + Q_c = Q_H \quad (1)$$

where
$\Delta\omega$ = work input
$Q_c$ = heat content (of fluid) at $T_c$
$Q_H$ = heat content (of fluid) at $T_H$ The coefficient of performance of the heat pump is defined, in warming mode, as:

$$C_{pw} = \frac{Q_H}{\Delta\omega} = \frac{Q_H}{Q_H - Q_c} \quad (2)$$

and in cooling mode, as:

$$C_{pc} = \frac{Q_c}{\Delta\omega} = \frac{Q_c}{Q_H - Q_c} \quad (3)$$

It will be noted that $C_{pw}$ and $C_{pc}$ are each greater than 1, in value. Generally, it is found that commercial heat pumps have coefficients of performance ranging from about 1.5 up to about 5. Note that it is desired to operate a heat pump with as low a $\Delta\omega$ value as possible, in order to conserve energy input, and that the lower $\Delta\omega$, for a fixed $Q_H$ or $Q_c$, the higher the coefficient of performance.

In distillation technology, hot feed water is vaporized, the vapor then being condensed. It is found that one pound of water requires about 150 BTU's of energy to raise its temperature from 62° F. (ambient) to 212° F. (boiling temperature at one atmosphere of pressure); further, that one pound of water then requires about 1000 BTU's of energy input to vaporize it. Conversely, when the vapor is condensed, it releases 1,000 BTU's. In the case of one pound of seawater, about 1 to 2 BTU's is theoretically required to remove the salt content.

It is seen from the above that straight-forward distillation to remove salt from seawater requires from 500 to 1,000 times more energy than theoretically is necessary to remove the salt content from one pound of such seawater. Such straight-forward distillation does not contemplate recovery of the latent heat of condensation from the product distillate, so that it becomes imperative to recover that latent heat if efficiency is to be achieved in terms of using only 1 to 2 BTU's energy to remove the salt. In this regard, and for purposes of comparison, other processes to remove salt require the following listed BTU input ranges to remove salt from one pound of seawater:

| Process | Energy input Req'd. | |
|---|---|---|
| reverse osmosis | 25-50 | BTU |
| solar still (multiple effect) | 25-100 | " |
| flash evaporation still | 100-200 | " |

-continued

| Process | Energy input Req'd. |
|---|---|
| (multiple effect) centrifugal still | about 28 " |

All of these required energy inputs are far too high in relation to the 1-2 BTU's theoretically required.

SUMMARY OF THE INVENTION

It is a major object of the invention to provide system, method and apparatus incorporating heat pump and distillation technology combined in such manner as to achieve extremely low energy input requirements for system operation to produce condensate. As will be seen, the heat content of the liquid to be distilled is raised in the heat pump prior to its evaporation in the still, and the latent heat of condensation of such vapor is then recovered at the still and transferred to a coolant fluid which is circulated to the "cold" portion or side of the heat pump for transfer as $Q_c$ (plus the input to the liquid to liquid heat pump) to the liquid to be distilled.

Basically, and in its apparatus aspects the system includes, in combination, (a) a heat pump having first and second fluid passing portions, the pump operable to transfer heat to distillable fluid in said first portion from coolant in said second portion and from a heat input source, (b) distillation means having first and second zones, the first zone connected with the heat pump first portion to receive heated fluid therefrom for condensation at said first zone, the second zone extending in latent heat receiving proximity to said first zone, the second zone connected with the heat pump second portion to circulate heated coolant thereto after transfer of latent heat to said coolant in said second zone.

In this manner, coefficients of performance in excess of 20/1 may be achieved.

Further, and as will be seen, the (b) means typically includes a condenser to pass the coolant (the condenser forming the second zone), and in one form of the invention the (b) means includes a heat transferring barrier such as a thin metal plate. The plate separates the first and second zones, and allows condensation on its side facing the first zone, while transferring latent heat to the coolant fluid flowing in the condenser at the opposite side of the barrier. In another form of the invention, the condenser may be located directly within the first zone, as will be seen.

Additional objects include the provision of a first heat exchanger passing hot condensate in heat exchange relation with feed fluid to be supplied to the first zone, to preheat the feed fluid; and the provision of a second heat exchanger connected to the heat pump to receive compressor waste heat, and also connected to pass the feed fluid for transfer of such heat to the latter, for preheating. Finally, concentrated brine may be removed from the process, as will be seen.

These and other objects and advantages of the invention, as well as the details of an illustrative embodiment, will be more fully understood from the following specification and drawings, in which: In this regard, atmospheric pressure is not necessary; one can adjust the pressure of the still and control the corresponding boiling point of the fluid to match the temperature of the heat source.

DRAWING DESCRIPTION

FIG. 1 is a system diagram showing one preferred form of the invention;

FIG. 2 is a diagram showing a heat pump used in FIG. 1; and

FIG. 3 is a fragmentary elevation showing details of a modified condensation zone and a fluid zone for reception of latent heat.

DETAILED DESCRIPTION

In FIGS. 1 and 2, a liquid-liquid heat pump 10 has first and second fluid passing portions 11 and 12. First portion 11 may for example include condenser 13 wherein heated first fluid supplied from compressor 14 is condensed to release latent heat transferred to second fluid passing through coil 15. The coil may wrap about the condenser for heat exchange. If the second fluid circulated through the coil is water (for example) it is heated to a level and pressure for later delivery at 16 as wet steam, as will be discussed. The second portion 12 of the heat pump may for example include an evaporator 17 wherein heated first fluid or liquid, circulated from the condenser via line 18, expansion valve 19 and line 20, is evaporated and returned to the compressor via line 21. Evaporation is accompanied by heat transfer from coolant or heating fluid (third fluid) circulating through coil 22 wrapped (for example) about the evaporator, as shown. Such fluid coolant flows via lines 23 and 24 to and from a cooling coil or other appropriate heat transfer structure 25 shown in FIG. 1, whereby a closed coolant flow system is provided. The coolant may for example consist of Freon or other fluid.

The invention also includes means having first and second zones, the first zone connected with the heat pump first portion to receive heated first fluid therefrom for condensation at the first zone. In the example, the first zone is shown at 27 and is defined by a receptacle 28 which may be inclined as shown. The receptacle includes a bottom wall 29 covered with insulation 30, a top wall or barrier 31, end walls 32 and 33, and side walls (not shown). Barrier 31 (heat conductive metal plate) may be thin for efficient transfer of latent heat from condensate forming on the under surface 31a of the barrier. Metallic cooling coil 25 extends in heat conducting contact with metal wall 31, so that latent heat from the condensate flows to the fluid in the coil for recirculation to the heat pump as described. The condensate drains along wall surface 31a rightwardly and downwardly for collection at trough 33 and removal from the receptacle via line 34, and valve 35. Coil 25 for example forms the second zone referred to above.

The hot condensate may for example consist of distilled water, and the input fluid supplied via line 16 may for example consist of brine at a temperature and pressure to produce wet steam when introduced into the receptacle at 36. Vapor is formed as at 36a. Concentrated hot brine drains rightwardly and downwardly on bottom wall 29, for removal via duct 37. The brine may be in part bled off at 38, and in other part returned via line 39 to the heat pump. Make-up or supply brine is fed from source 40 and via line 41 to line 39, as shown. Brine may comprise seawater.

Structure 25 may comprise copper pipes. Insulative top wall appears at 70.

$T_1$ may be about 140° F. and $P_1$ about 2.8892 psi (the still operated at less than atmospheric pressure but just above a pressure corresponding to boiling point of 140° F.). $T_2$ is about 10° F. less than $T_1$, i.e. about 130° F.

A first heat exchanger is shown at 42 to pass a side stream of hot condensate, supplied via line 43 from first zone 27, in heat exchange relation with feed fluid supplied via line 41. The latter fluid is then pre-heated, for increased efficiency. A valve 44 is shown in series with line 43 to control the flow of hot condensate to exchanger 42, to achieve maximum efficiency.

A second heat exchanger is shown at 45 as having a first coil 45a connected via lines 46 and 47 with a coil 48 in the heat pump. Waste heat from the latter, as from the compressor, is transferred to the coil 48 and then to coil 45a via appropriate heat exchanger liquid. A second coil 45b in exchanger 45 passes feed fluid from source 40 so that heat from coil 45a is transferred to coil 45b and to the feed fluid to enhance efficiency.

FIG. 3 shows a modified receptacle 128 (corresponding to receptacle 28), and having top wall 131, bottom wall 129, and insulation 130 and 130a. Coolant coil 125 (corresponding to coil 25) is located directly within the first zone 127 (corresponding to zone 27), and liquid condensate collects on and drains along the exterior surfaces of coil stretches 125a, rightwardly and downwardly, for collection and removal, as previously described.

I claim:

1. In a heat transfer apparatus, the combination comprising
    (a) a heat pump having first and second fluid passing portions, the pump operable to transfer heat to distillable fluid in said first portion from coolant in said second portion and from a heat input source,
    (b) distillation means having first and second zones at lower and upper sides respectively of a heat transferring barrier plate which is inclined from horizontal, the first zone having an upper section connected with the heat pump first portion to receive heated fluid therefrom for vaporization at said first zone and condensation at the under side of said plate, there being a return line connected between a lower section of said first zone and said heat pump first portion to return concentrate to said heat pump first portion for re-heating, the second zone extending in latent heat receiving proximity to said first zone and via said barrier plate, the second zone connected with the heat pump second portion to circulate heated coolant thereto after transfer of latent heat to said coolant in said second zone, and to return said coolant to said second zone after transfer of heat from the coolant in the heat pump second portion, said heat pump and said distillation means being separate units.

2. The combination of claim 1 wherein said means includes a condenser to pass said coolant, the condenser forming said second zone.

3. The combination of claim 1 wherein said means includes a receptacle defining said first zone.

4. The combination of claim 2 wherein said means includes a receptacle defining said first zone, said condenser located within said first zone and defined by the underside of said plate.

5. The combination of claim 1 including a first heat exchanger passing hot condensate from said first zone in heat exchange relation with feed fluid to be supplied to said first zone to preheat said fluid.

6. The combination of claim 1 including ducting connected with said first zone to receive liquid therefrom for return circulation to said first zone via said heat pump first portion.

7. The combination of claim 1 including a second heat exchanger connected to said heat pump to receive compressor heat therefrom, and connected to pass said feed fluid for transfer of heat from the heat pump to said feed fluid.

8. The combination of claim 1 including structure passing said fluid in said zones and in said heat pump first portion.

9. The combination of claim 8 including structure passing said fluid which consists of water in said zones, and in said heat pump first portion.

10. The combination of claim 8 including structure passing said fluid consisting of brine in said zones, and in said heat pump first portion.

11. The combination of claim 10 wherein said first zone has a concentrated brine discharge.

12. The combination of claim 10 including means recirculating said concentrated brine discharge to said first portion of the heat pump.

13. The combination of claim 10 including flow means recirculating a first stream of the concentrated brine discharge to said first portion of the heat pump, and outlet means removing a second stream of the concentrated brine discharge for disposal.

* * * * *